United States Patent [19]

Bouchez

[11] Patent Number: 5,538,117
[45] Date of Patent: Jul. 23, 1996

[54] SAFETY DEVICE FOR A SYSTEM TRANSPORTED ON BOARD A VEHICLE, IN PARTICULAR AN AIRCRAFT

[75] Inventor: Bernard Bouchez, Palaiseau, France

[73] Assignee: Messier-Bugatti, France

[21] Appl. No.: 436,865

[22] Filed: May 8, 1995

[30] Foreign Application Priority Data

Nov. 5, 1994 [FR] France .................................. 94 05809

[51] Int. Cl.$^6$ ............................................ F16F 9/36
[52] U.S. Cl. ........................ 188/371; 188/275; 188/300; 188/269; 267/64.12; 267/64.15; 296/68.1; 297/216.1
[58] Field of Search ................... 188/275, 283, 188/371–377, 269, 298, 318, 280, 300, 378–380; 303/24.1, 9.68; 16/83; 244/104 FP, 122 R, 17.17, 138 R; 267/64.15, 64.12; 293/133; 297/216.1, 216.16, 216.18; 296/68.1

[56] References Cited

U.S. PATENT DOCUMENTS

| | | | |
|---|---|---|---|
| 1,281,079 | 10/1918 | Sears | 188/275 |
| 1,492,328 | 9/1921 | Lang . | |
| 1,526,169 | 2/1925 | Melchior | 188/275 |
| 2,329,803 | 9/1943 | Whisler, Jr. . | |
| 2,375,377 | 5/1945 | Mitereff | 188/275 |
| 3,633,966 | 1/1972 | Epple et al. | 188/275 |
| 4,898,264 | 2/1990 | Miller | 188/275 |
| 5,271,314 | 12/1993 | Derrien | 188/371 |
| 5,462,140 | 10/1995 | Cazort et al. | 188/275 |

FOREIGN PATENT DOCUMENTS

| | | |
|---|---|---|
| 0014660 | 2/1980 | European Pat. Off. . |
| 0051506 | 10/1981 | European Pat. Off. . |
| 0072323 | 8/1982 | European Pat. Off. . |
| 0115435 | 1/1984 | European Pat. Off. . |
| 0275735 | 12/1987 | European Pat. Off. . |
| 0564325 | 3/1993 | European Pat. Off. . |
| 0564324 | 3/1993 | European Pat. Off. . |
| 912553 | 7/1945 | France . |
| 1048137 | 10/1951 | France . |
| 1105479 | 7/1955 | France . |
| 1531990 | 7/1967 | France . |
| 93128 | 10/1967 | France . |
| 2242264 | 9/1974 | France . |
| 802211 | 2/1951 | Germany . |
| 1045256 | 7/1954 | Germany . |
| 2745768 | 4/1978 | Germany | 188/275 |
| 5905087 | 3/1984 | Japan . | |
| 1072463 | 3/1965 | United Kingdom . | |

OTHER PUBLICATIONS

Patent Abstracts Of Japan vol. 17, No. 541(M–1488) 29 Sep. 1993 & JP–A–05 147 892 (Hitachi Juki Seizo) 15 Juin 1993.

*Primary Examiner*—Douglas C. Butler
*Attorney, Agent, or Firm*—Sixbey, Friedman, Leedom & Ferguson; Gerald J. Ferguson, Jr.; Tim L. Brackett, Jr.

[57] ABSTRACT

The invention relates to a safety device for a system transported on board a vehicle, in particular an aircraft, said system being connected to the structure of the vehicle via at least one element having a cylindrical body and a telescopic rod. According to the invention, the body and the rod of each element together define two internal fluid chambers which are normally isolated from each other, a communication passage being provided between the two chambers and normally being closed by an associated throttling valve, the throttling valve being controlled by acceleration-sensing means using a mass that is movable in the axial direction of the telescopic element and that is associated with a rated spring. The means is organized to cause the throttling valve to open as soon as the sensed acceleration exceeds a threshold which is predetermined as a function of the system to be protected, the acceleration of the system thus being kept below the threshold by the telescopic element changing in length.

9 Claims, 3 Drawing Sheets

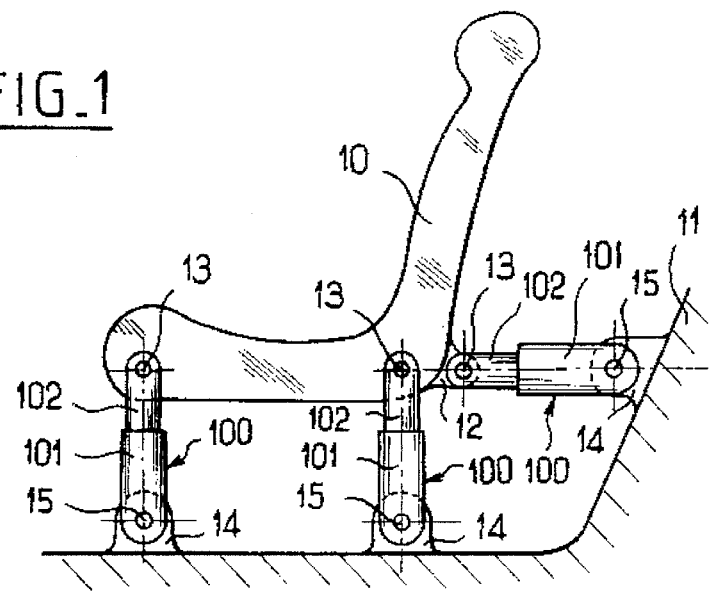
FIG_1
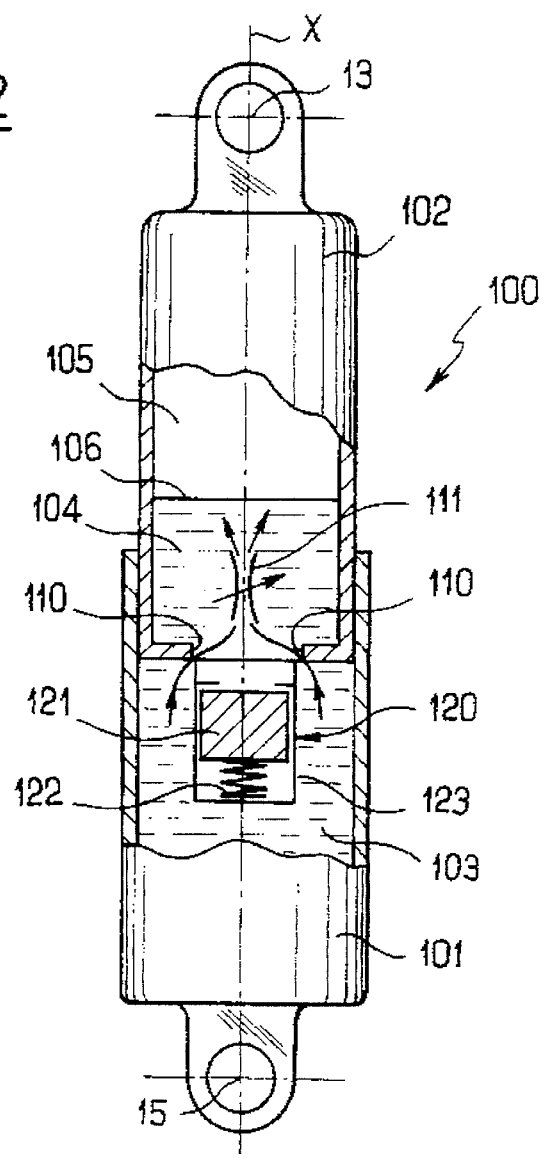
FIG_2

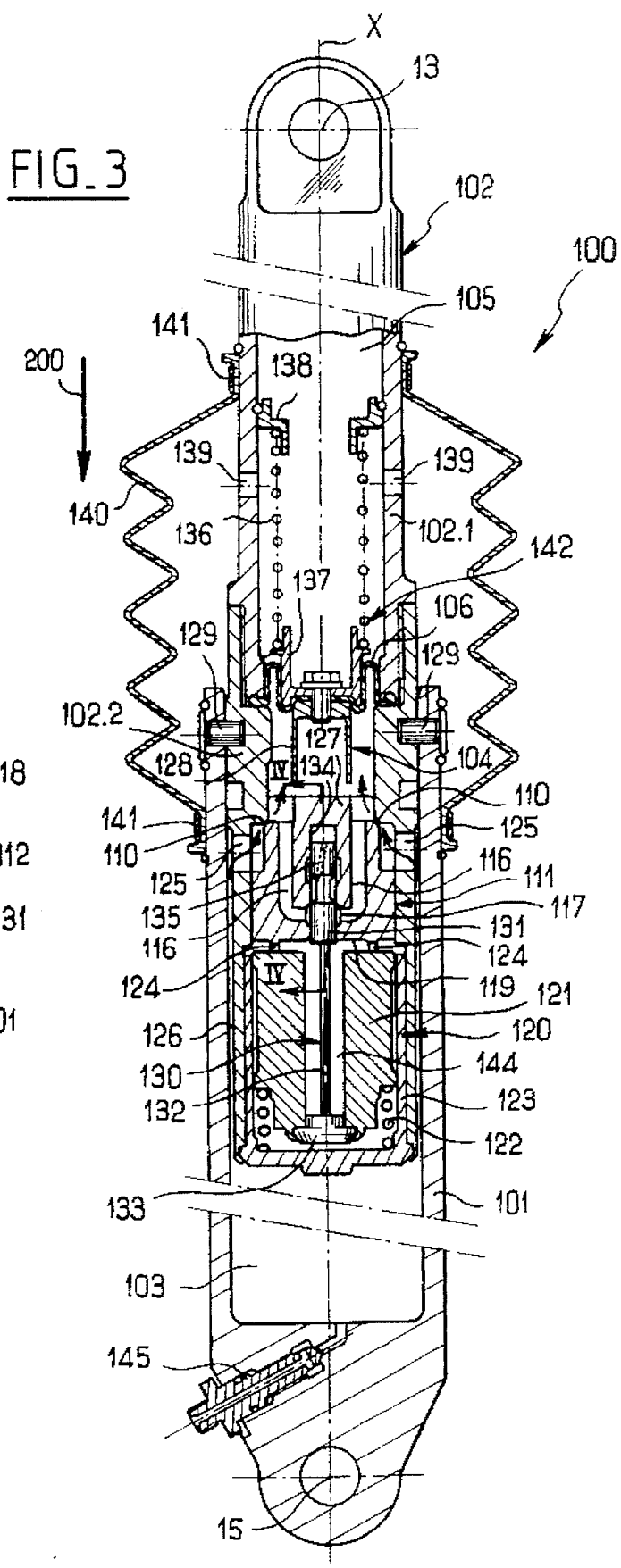

SAFETY DEVICE FOR A SYSTEM TRANSPORTED ON BOARD A VEHICLE, IN PARTICULAR AN AIRCRAFT

FIELD OF THE INVENTION

The invention relates to a safety device for a system transported on board a vehicle, in particular an aircraft, such as a helicopter. The device is intended to provide protection in the event of shock, in particular, for an aircraft, in order to cope with a crash landing.

The term "transported system" should be understood in the widest sense, i.e. covering not only all types of transported object stowed in the vehicle body by slinging, but also objects with people, e.g. passengers and their seats.

BACKGROUND OF THE INVENTION

The body of an aircraft and the shock-absorbers of its landing-gear are designed to absorb the kinetic energy stored by the total moving mass in the event of a crash landing. In particular, for a helicopter, the vertical landing speed may be as much as 12 meters per second (m/s). The landing-gear shock-absorbers then absorb a portion of the kinetic energy, and the remainder is absorbed by the helicopter body deforming or breaking up in part.

For combination actuator/shock-absorbers specially designed for such a situation, reference may be made to the following documents that come from the Applicant: EP-A-0 564 325, EP-A-0 564 324, EP-A-0 051 506, and EP-A-0 014 660, and also to the following documents: EP-A-0 275 735, EP-A-0 115 435, and EP-A-0 072 323.

In spite of the limit on acceleration (in a vertical direction) obtained by means of the landing-gear, it can still happen that the acceleration to which the transported system is subjected exceeds a critical threshold (e.g. greater than 20 g, which gives rise,to major injury to people being transported), either because the limitation on acceleration is insufficient, or else because of the helicopter moving in directions that are relatively random.

In particular, the acceleration of the seats can exceed the critical threshold for the people sitting on them. Similarly, the acceleration to which slinging is subjected may exceed the critical threshold for the objects stowed in the aircraft body.

The commonly used solution then consists in using shock-absorbers for connecting the objects concerned (seats, transported loads) to the structure of the aircraft. In particular, peak-limiting shock-absorbers are presently used beneath the seats, with a shock-absorber being disposed between each seat and the body of the aircraft. For example, devices are known that rely on plastic deformation of a tube into which a larger-diameter ball is thrust (each vertical seat fastening is then supported on a ball disposed in the neck of an opening to a tube which is designed to deform plastically as it absorbs energy), and although such a system is indeed cheap, it is not very accurate (accuracy being a function of manufacturing tolerances and of the materials used).

In general, when using shock-absorbers, the acceleration of the transported system depends necessarily on its mass and on changes in the speed of the supports to which it is attached. It is therefore very difficult to be accurate, given that the weight of a person (plus equipment in a military helicopter) can vary to a large extent, such that, for given acceleration, the forces involved can vary over a range of two to one. This can naturally be even more significant with multi-person seats that may be occupied by one person or by several.

OBJECTS AND SUMMARY OF THE INVENTION

The invention thus seeks to resolve this problem by designing a safety device that does not present the above-specified limitations and drawbacks.

An object of the invention is thus to provide a safety device capable of performing an acceleration-limiting function quickly, reliably, and effectively, without being affected by variations in the mass of the system to be protected or variations in the speed of the supports to which it is attached.

More particularly the invention provides a safety device for a system transported on board a vehicle, in particular an aircraft, said system being connected to the structure of the vehicle via at least one element having a cylindrical body and a telescopic rod, wherein the body and the rod of each element together define two internal fluid chambers which are normally isolated from each other, a communication passage being provided between said two chambers and normally being closed by an associated throttling valve, said throttling valve being controlled by acceleration-sensing means using a mass that is movable in the axial direction of the telescopic element and that is associated with a rated spring, said means being organized to cause the throttling valve to open as soon as the sensed acceleration exceeds a threshold which is predetermined as a function of the system to be protected, the acceleration of the system thus being kept below said threshold by the telescopic element changing in length.

In a particular embodiment, the acceleration-sensing means uses a single moving mass and a rated spring on either side of said mass, thereby causing the throttling valve to be opened whenever the telescopic element is subjected to excessive acceleration, both in compression and in traction.

Such a variant is most advantageous, for example, when slinging objects in the body of the aircraft. With seats, it is generally possible to make do with a single direction of operation, and thus with a single rated spring.

Preferably, the throttling valve is controlled by a slide valve which is directly actuated by the moving mass. In which case, it is advantageous for the throttling valve to be servo controlled to the position of the slide valve so as to track said slide valve continuously.

It is also advantageous to provide for the throttling valve and/or the acceleration-sensing means to be mounted inside the telescopic element, e.g. inside the body thereof. In which case, it is advantageous for the throttling valve to be controlled by a slide valve implemented in the form of a pilot slide that is coaxial with and inside said throttling valve, said pilot slide being directly coupled to the moving mass which is mounted to slide along the axis of said throttling valve, and for throttling valve to be normally kept in the closed position by direct thrust from the moving mass which is urged against said valve by the associated rated spring.

Also preferably, one of the internal chambers is a high-pressure chamber, while the other one is a low-pressure chamber, the low-pressure chamber being continuously pressurized by means comprising a spring) and a deformable element such as a membrane or a bellows. In which case, it is advantageous for the body and the rod of the telescopic element to be normally locked together by shear pins which are designed to shear when the predetermined acceleration threshold is reached by a protected system of minimum mass.

BRIEF DESCRIPTION OF THE DRAWINGS

Other characteristics and advantages of the invention appear more clearly in the light of the following description and the accompanying drawings that relate to a particular embodiment. In the drawings:

FIG. 1 shows a seat connected to a structure of a vehicle such as an aircraft by three pairs of telescopic elements, each constituting a safety device of the invention, thereby enabling acceleration to be limited both in the horizontal direction and in the vertical direction;

FIG. 2 is an essentially functional diagrammatic view of a telescopic element made in accordance with the invention;

FIG. 3 is an axial section through such a telescopic element, showing its essential structural components in the normal position (throttling valve closed), this section is to be viewed in association with FIG. 4 that shows a fragmentary section on IV—IV of FIG. 3.

MORE DETAILED DESCRIPTION

Figure 5:
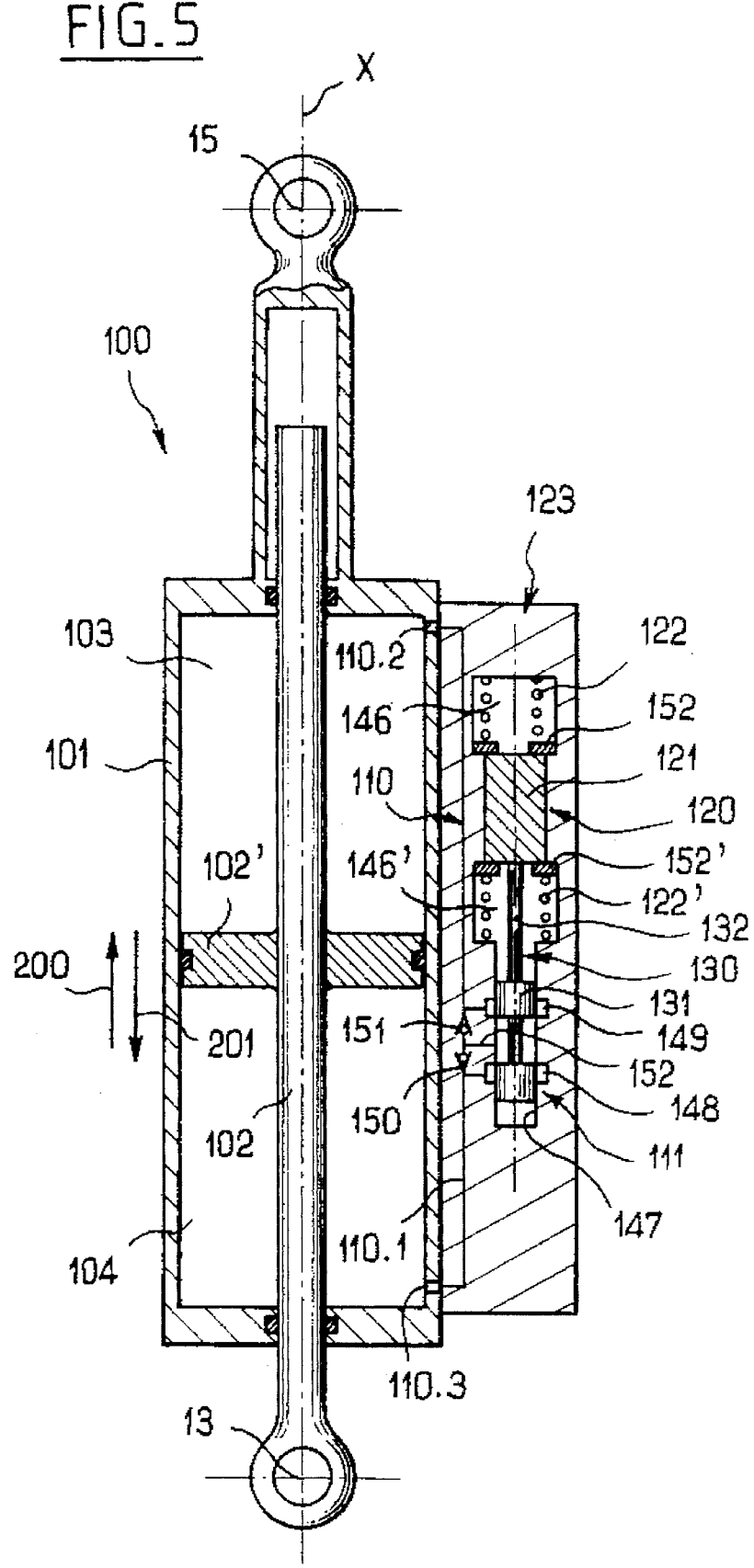
FIG. 5 shows another variant in which the acceleration-sensing means associated with an actuator can act in both directions (acceleration above a predetermined threshold either in compression or in traction).

FIG. 1 shows a seat 10 connected to the structure 11 of an aircraft by safety devices of the invention, said devices being in the form of telescopic elements 100 connected in hinged manner to the seat 10 and to the structure 11 of the aircraft. In this case, there are provided two pairs of telescopic elements extending in an essentially vertical direction, being hinged at 13 to the seat 10 and at 15 to a tab 14 secured to the aircraft structure 11. Another pair of telescopic elements 100 extends in an essentially horizontal direction, each being hinged at 13 to a tab 12 to the seat 10 and at 15 to a tab 14 secured to the aircraft structure 11. Each telescopic element 100 comprises a cylindrical body 101 and a telescopic rod 102, and the length of the telescopic element remains constant so long as acceleration in the direction of its axis does not exceed a threshold which is predetermined as a function of the system to be protected. In particular, the protection imparted to the seat 10 and to the person or the people concerned is organized so as to apply a limit to acceleration of the system, both in a vertical direction and in a horizontal direction.

Such telescopic elements therefore operate in a manner that is radically different from peak-limiting shock-absorbers of traditional type, insofar as the present telescopic elements are capable of changing length so as to keep the acceleration of the transported system below a predetermined threshold, thereby providing protection that is independent both of the mass of the system and of variations in the speed of the support to which it is attached. With peak-limiting shock-absorbers, the resulting force is constant (e.g. the force associated with plastic deformation of a tube by an associated ball), and therefore cannot take account of different masses, whereas telescopic elements made in accordance with the present invention serve to obtain a connection force threshold that varies as a function of the mass concerned.

The essentially functional diagrammatic view of FIG. 2 shows the basic organization of a telescopic element 100 made in accordance with the invention. The telescopic element 100 includes cylindrical body or cylinder 101 about an axis X and having a telescopic rod 102 received therein. The cylinder 101 and rod 102 have end tabs enabling them to be mounted, e.g. at 15 for connection to the aircraft structure, and at 13 for connection to a seat.

The cylinder 101 and the rod 102 define two internal fluid chambers, referenced 103 and 104, which chambers are normally isolated from each other. The term "normally" means that operation is normal, i.e. that no crash landing or critical shock is taking place. A communication passage 110 is provided between the two chambers 103 and 104, and this passage is normally closed by an associated throttling valve 111. The fluid situated in the chamber 104 may be in direct contact with a gas chamber 105, with the interface surface being referenced 106 (the interface surface could be the top surface of the fluid, or it could alternatively be implemented in the form of a deformable element such as a membrane or a bellows, as described in greater detail with reference to FIG. 3).

According to an essential aspect of the invention, the throttling valve 111 is controlled by acceleration-sensing means 120, using a mass 121 that is movable along the X axis direction of the telescopic element 100 and that is associated with a rated spring 122, said means being disposed to cause the throttling valve to open as soon as the detected acceleration exceeds a threshold which is predetermined as a function of the system to be protected. In the present case, a housing 123 is shown diagrammatically and it contains a mass 121 that is free to slide as a piston in the X axis direction, and a rated spring 122 urges the moving mass 121 into abutment in a high position in the figure. This position corresponds to the throttling valve 111 being closed. As soon as the acceleration detected by the means 120 exceeds a predetermined threshold, the moving mass 121 compresses the rated spring 122, thereby causing the throttling valve 111 to open, and thus enabling the acceleration to be limited by keeping it at the level of said predetermined threshold. As soon as the acceleration comes back below the threshold, the moving mass 121 returns to its high abutment position under drive from its spring 122, and the throttling valve 111 is closed again. As a result, the acceleration of the mass of the system to be protected is genuinely servo controlled by the rating of the spring. If the mass of the transported system is always the same, then the acceleration limiter limits the connection force to a pre-established value. However, if the mass of the transported system can Wary, then the threshold for the connection force varies likewise as a function of the mass, thus making it possible in the application mentioned above to accommodate different weights of occupant or occupants in the seat, even with a multi-person seat. Naturally, each time the throttling valve is opened, there is a corresponding reduction in the length of the telescopic element, such that the total length of the telescopic element must be sufficient to enable it to perform its acceleration-limiting function under optimum conditions.

The acceleration-sensing means 120 making use of a moving mass and an associated rated spring thus constitute a genuine instrument for measuring the acceleration of the transported system, thereby guaranteeing that the safety device is entirely adaptable to the type of system concerned.

If six telescopic elements are used to connect a seat to the aircraft structure, as shown in FIG. 1, then the acceleration of the transported system (the seat together with any occupants) is certain to be limited to less than a predetermined threshold, both in a vertical direction and in a horizontal direction, it being possible to provide different thresholds in these two directions, where appropriate.

FIGS. 3 and 4 serve to distinguish the various components constituting a telescopic element 100 of the above-described type.

There can thus be seen the cylinder 101 in which a telescopic rod 102 is received, the rod being implemented, in this case, in two portions 102.1 and 102.2 for the purpose of holding a deformable separation membrane 106. The portion 102.2 of the rod extends inside the cylinder 101 to receive the acceleration-sensing means 120 and the throttling valve 111. The moving mass 121 is thus slideably mounted in its housing 123, and the associated rated spring 122 keeps said moving mass pressed against the throttling valve 111, or more precisely in the present case, against lugs 124 that project from the bottom face thereof, so as to leave a free passage for fluid beneath the surface 119 of said valve, which surface occupies the full section thereof. The portion 102.2 of the tubular rod 102 also has orifices 125 enabling the fluid in the chamber 103 (which is preferably a high-pressure chamber) to reach the annular surface 118 of the throttling valve 111, after passing through an annular space 126 defined by the inside surface of the cylinder 101. The annular surface 118 corresponds to the annular section of the valve. The seat of the valve 111 co-operates with the corresponding thrust edge to define a passage 110 which is normally closed and which can be opened only by the acceleration-sensing means 120 being activated.

In the embodiment shown herein, the throttling valve 111 is controlled by a slide valve 130 which is directly actuated by the moving mass 121. In this case, the slide valve 130 is implemented in the form of a pilot slide 131 received in an associated blind central bore 134 of the valve 111, with the slide being connected by a rod 132 to a fixing endpiece 133 secured to the moving mass 121. To this end, the mass 121 has a central recess 144 along which the linking rod 132 passes. Thus, as soon as the moving mass 121 begins to compress the spring 122, it simultaneously drives the pilot slide 131 and, as described below, the organization provided herein servo controls the position of the throttling valve 111 to the position of the slide valve 130, with the throttling valve continuously tracking the slide valve, and thus the moving mass.

The throttling valve 111 has two internal channels 116 that open out into the top portion thereof and that communicate with each other via an annular chamber 117. As can be seen more clearly in FIG. 4, the throttling valve 111 also includes two other internal channels 112 which open out downwards in the full-section surface 119 of said throttling valve 111, and they are united in the central chamber 113 defined by the narrowest central portion of the pilot slide 131. The throttling valve 111 also includes two through channels 114 that open out laterally above the annular section surface 118 and that communicate with each other via an annular chamber 115. As can be seen in FIG. 3, the top of the pilot slide 131 has a communication channel 135 that facilitates free sliding of said slide relative to the throttling valve 111.

Above the throttling valve 111, there can be seen the second fluid chamber 104 which is preferably a low-pressure chamber, which chamber is defined, in part, by the above-mentioned deformable membrane 106. The membrane 106 has a peripheral rim that is clamped between the two portions 102.1 and 102.2 making up the telescopic rod 102, and it is subjected to drive from a thrust spring 136 bearing against a fixing cup 137 having the central portion of the membrane 106 held thereagainst by a centering sleeve 128 that normally bears against the top central end 127 of the throttling valve 111. The top portion of the spring 136 is held by a ring 138 that is prevented from moving axially inside the rod 102. The assembly 142 constituted by the membrane 106 and the associated thrust spring 136 constitutes means serving to keep the low-pressure chamber 104 permanently under pressure and also to allow differential expansion to take place. The portion 102.1 of rod 102 also has lateral orifices 139, and there can be seen an external protective bellows 140 that is held in position at each of its two ends by associated collars 141. Close to the hinged end of the cylinder 101, there can be seen a filling valve 145 that is used for initial preparation of the device.

Shear pins 129 are also provided between the cylinder 101 and the rod 102, which pins normally lock the cylinder to the rod, and they are designed to shear in the event of the predetermined acceleration threshold being reached when the protected system is of minimum mass. This ensures that the shear pins do indeed shear before the acceleration-sensing means 120 begin to act by opening the throttling valve 111 and until the acceleration drops back to below the predetermined threshold, thereby giving rise to a corresponding reduction in the length of the telescopic element 100, in the compression direction of said telescopic element, as recalled by the direction of arrow 200. The presence of the shear pins 129 also serves to avoid any need for permanent thrust to be maintained on the fluid in normal operation, thereby providing good protection against possible leakage of hydraulic fluid.

In the rest position as shown in FIG. 3, the fluid in the high-pressure chamber passes through the annular passage 126 and the lateral orifices 125, then via the channels 114, the chamber 115, the chamber 113 and the channels 112, and finally reaches the full-section surface 119 of the throttling valve 111. The annular section surface 118 is also subjected to the pressure of the fluid. The throttling valve 111 is therefore in hydraulic equilibrium, and it is kept in the closed position solely by the return spring 122. As soon as the acceleration in the direction 200 exceeds the predetermined threshold, the moving mass 121 compresses the return spring 122 and takes the pilot slide 131 with it, thereby having the effect of interrupting fluid communication via the central chamber 113 for the high pressure fluid, such that the high pressure fluid no longer reaches the full section surface 119 of the valve 111. As a result, the high pressure flow no longer acts on the annular section surface 118, so the throttling valve 111 also moves down, permanently tracking the pilot slide 131. Fluid also escapes via the chamber 117 rising through the axial channels 116. The throttling valve 111 is thus mounted as a tracking piston, thereby making it possible to obtain operation that is both reliable and fast.

In addition to the position of the throttling valve 111 being servo controlled to that of the pilot slide valve, the acceleration of the mass of the system to be protected is also servo controlled relative to the fixed rating of the return spring 122. If the passage 110 opens too much, then the fluid flows without resistance and the spring 122 rapidly takes over, causing the pressure and the acceleration to increase. Conversely, if the throttling valve is not open wide enough, then both pressure and acceleration decrease.

It is of interest to observe that, apart from hydrodynamic or friction forces, the pilot slide 131 is not subjected to any force that could interfere with its measurement of acceleration. As a result, the device is particularly sensitive and can act very quickly, e.g. within about three milliseconds.

In the event of the above-described safety device coming into operation, the influx of high pressure fluid into the chamber 104 generally has the effect of breaking the membrane 106, thereby allowing the fluid to flow freely into the chamber 105, with the fluid then being able to reach the outlet orifices 139 quickly and without resistance. This naturally means that, after such a situation has occurred, the telescopic element will subsequently need to be reconditioned.

The predetermined acceleration threshold may be selected to be about 15 g to 20 g assuming that people are involved, or it may have some other value if the masses are inert, as a function of the natures of the masses to be protected.

In all cases, the throttling valve is opened as a function of deceleration and not of pressure, and it provides a force that is automatically matched to the corresponding mass to be protected. The energy dissipated depends on the mass to be protected and on the design operating curve: it may vary as a function of application, and it determines the length of the telescopic element.

FIG. 5 shows a variant in which the acceleration-sensing means, as associated with an actuator, is capable of sensing acceleration in both directions (in which case, acceleration is kept below a predetermined threshold, both in compression and in traction).

The body of the telescopic element 100 is constituted by a cylinder 101, and the telescopic rod 102 is a sliding rod having a piston 102'. There can be seen chambers 103 and 104 on either side of the piston 102', and these chambers can be put into communication with each other via a passage 110 which is constituted, in this case, by a pipe 110.1 interconnecting orifices 110.2 and 110.3 of the chambers 103 and 104. There can also be seen a lateral body 123 containing a moving mass 121 coupled to a slide valve 130 that includes a slide 131 which slides in an associated bore 147 of said body. This variant differs from the preceding variant in that the body 123 now has two spaces 146 and 146', each of which contains a respective spring 122 or 122' bearing against an associated washer 152 or 152' level with respective ones of the two ends of the moving mass 121. The body 123 also has two annular chambers 148 and 149 which are in communication with the pipe 110.1, there being two non-return valves 150 and 151 between these two points of communication on either side of a central connection line 152. Arrows 200 and 201 respectively represent the compression direction and the traction direction for the rod of this telescopic element 100.

If the cylinder 101 is subjected to sudden acceleration exceeding a predetermined threshold as set by the rating of the spring 122 (assuming compression along arrow 200), then the moving mass 121 compresses the spring 122 and the fluid in the chamber 103 can pass via the orifice 110.2, the chamber 149, the central line 152, the non-return valve 150, and the orifice 110.3. If acceleration is in the opposite direction (i.e. direction 201), then the moving mass 121 will move in the opposite direction, compressing the associated spring 122', so the predetermined acceleration threshold can then be the same as or different from the threshold set by the rated spring 122. Under such circumstances, the fluid in chamber 104 flows via orifice 110.3, chamber 148, central line 152, non-return 151, and orifice 110.2. In this case, the throttling valve 111 is constituted by the pilot slide 131. In a variant, and if there is room, it would naturally be possible to place the acceleration limiting device inside the cylinder of the actuator. Such an embodiment is particularly advantageous for slinging objects inside an aircraft, since it provides safety in two opposite directions.

By way of indication, a moving mass of about 200 grams may be used, and the associated spring or springs may be rated in such a manner as to determine the desired acceleration threshold.

A safety device has thus been made which performs an acceleration limiting function quickly, reliably and effectively, while being completely unaffected by variations in the mass of the system to be protected or by variations in the speed of the support to which it is attached.

The above-described device could naturally be mounted on either types of vehicle, and in particular on motor vehicles.

The invention is not limited to the embodiments described above, but on the contrary, it extends to any variants using equivalent means to reproduce the essential characteristics specified above.

I claim:

1. A crash safety telescopic element having a cylindrical body and a telescopic rod which together define two internal fluid chambers, wherein the two chambers are isolated from each other when no critical shock is taking place, a communication passage being provided between said two chambers and being closed in absence of critical shock by an associated throttling valve, said throttling valve being controlled by acceleration-sensing means using a mass that is movable in an axial direction of said element and being associated with at least one rated spring, said acceleration sensing means cooperating with said throttling valve so as to cause the throttling valve to open and the length of said telescopic element to change accordingly as soon as the sensed acceleration exceeds a predetermined threshold.

2. A device according to claim 1, wherein the acceleration-sensing means uses a single moving mass and two rated springs, with one rated spring on either side of said mass, thereby causing the throttling valve to be opened whenever the telescopic element is subjected to excessive acceleration, both in compression and in traction.

3. A device according to claim 1, wherein the throttling valve is controlled by a slide valve which is directly actuated by the moving mass.

4. A device according to claim 3, wherein the throttling valve is servo controlled to the position of the slide valve so as to track said slide valve continuously.

5. A device accordingly to claim 1, wherein the throttling valve and the acceleration-sensing means are mounted inside the cylindrical body of said telescopic element.

6. A device according to claim 5, wherein the throttling valve is controlled by a slide valve implemented in the form of a pilot slide that is coaxial with and inside said throttling valve, said pilot slide being directly coupled to the moving mass which is mounted to slide along the axis of said throttling valve.

7. A device according to claim 6, wherein the throttling valve is kept in the closed position in absence of critical shock by direct thrust from the moving mass which is urged against said valve by the associated rated spring.

8. A device according to claim 1, wherein one of the internal chambers is a high-pressure chamber, while the other one is a low-pressure chamber, the low-pressure chamber being continuously pressurized by means comprising a spring and a deformable element of the bellows type.

9. A device according to claim 8, wherein in absence of critical shock the body and the rod of said telescopic element are locked together by shear pins which are designed to shear when the predetermined acceleration threshold is reached by a protected system of minimum mass.

* * * * *